United States Patent
Marangon (10) Patent No.: US 10,532,790 B2
(45) Date of Patent: Jan. 14, 2020

(54) CONTROL DEVICE FOR A BICYCLE

(71) Applicant: CAMPAGNOLO S.r.l., Vicenza (IT)

(72) Inventor: Christian Marangon, Thiene (IT)

(73) Assignee: Campagnolo S.r.l., Vicenza (IT)

( * ) Notice: Subject to any disclaimer, the term of this patent is extended or adjusted under 35 U.S.C. 154(b) by 110 days.

(21) Appl. No.: 15/850,369

(22) Filed: Dec. 21, 2017

(65) Prior Publication Data

US 2018/0178877 A1 Jun. 28, 2018

(30) Foreign Application Priority Data

Dec. 23, 2016 (IT) .................. 102016000130728

(51) Int. Cl.
*B62L 3/02* (2006.01)
*B62M 25/04* (2006.01)

(52) U.S. Cl.
CPC .............. *B62L 3/02* (2013.01); *B62M 25/04* (2013.01)

(58) Field of Classification Search
CPC ......... B62L 3/02; B62M 25/04; B62M 25/045
See application file for complete search history.

(56) References Cited

U.S. PATENT DOCUMENTS

| | | | |
|---|---|---|---|
| 4,611,500 A * | 9/1986 | Nagano | B62L 3/02 74/489 |
| 6,957,597 B2 | 10/2005 | Irie et al. | |
| 7,793,565 B2 | 9/2010 | Orrico et al. | |
| 8,161,840 B2 | 4/2012 | Nago | |
| 8,261,888 B2 | 9/2012 | Tsai | |
| 8,459,142 B2 | 6/2013 | Orrico et al. | |
| 8,863,612 B2 | 10/2014 | Owyang | |
| 9,187,149 B2 | 11/2015 | Yamaguchi | |
| 9,242,695 B2 * | 1/2016 | Sala | B62K 23/06 |
| 2003/0019712 A1 | 1/2003 | Dal Prà | |
| 2008/0295638 A1 | 12/2008 | Miki et al. | |
| 2009/0114051 A1 | 5/2009 | Miki | |

(Continued)

FOREIGN PATENT DOCUMENTS

| | | |
|---|---|---|
| CN | 1390741 A | 1/2003 |
| CN | 101314382 A | 12/2008 |
| CN | 101428668 A | 5/2009 |

(Continued)

OTHER PUBLICATIONS

Italian Search Report and Written Opinion in Italian Application No. 102016000130728, dated Sep. 25, 2017, with English translation.

(Continued)

*Primary Examiner* — Thomas C Diaz (74) *Attorney, Agent, or Firm* — Volpe and Koenig, P.C.

(57) ABSTRACT

A bicycle control device has a body for mounting on a bicycle handlebar and a brake lever that rotates about a predetermined axis. The body has abutment portions defining a first brake lever release position and at least one second brake lever release position. The control device includes an adjuster for selecting a release position. The adjuster has a pin that is mounted on the brake lever and slides substantially parallel to the predetermined axis between abutment portions and a coupler that couples with the pin; the coupler being fixed with the brake lever and configured to selectively stop the pin in a selected position.

11 Claims, 11 Drawing Sheets

(56) References Cited

U.S. PATENT DOCUMENTS

2012/0318096 A1    12/2012   Fukao et al.
2015/0353164 A1    12/2015   Sala

FOREIGN PATENT DOCUMENTS

| | | |
|---|---|---|
| CN | 102826193 A | 12/2012 |
| CN | 103847909 A | 6/2014 |
| DE | 9415887 U1 | 2/1995 |
| DE | 202015002728 U1 | 9/2015 |
| JP | 2016-13770 A | 1/2016 |

OTHER PUBLICATIONS

Chinese Office Action for Application 201711418680.9 with English translation, dated Jul. 1, 2019.

\* cited by examiner

CONTROL DEVICE FOR A BICYCLE

CROSS REFERENCE TO RELATED APPLICATION(S)

This application claims the benefit of Italian Patent Application No. 102016000130728, filed on Dec. 23, 2016, which is incorporated herein by reference as if fully set forth.

FIELD OF INVENTION

The present invention relates to a control device for a bicycle.

In particular, the invention relates to a control device used for actuating a brake for the front or rear wheel of the bicycle and, possibly, at least one other bicycle equipment, such as for example a (front or rear) derailleur, a servo-assisted gearshift or a cycle computer.

BACKGROUND

The control device of the present solution is preferably intended to be used in a racing bicycle, namely a bicycle having a handlebar with opposite curved free end portions.

The control device of the solution can also be gripped or used by the cyclist to ride the bicycle, as an alternative to the classic handgrip provided on the curved free end portions of the handlebar.

Known control devices typically comprise a body intended to be fixed to the curved free end portions of the handlebar through conventional connection elements, for example a clip.

The body is typically defined by an outer side wall, an inner side wall substantially parallel to the outer side wall, an upper transverse wall that connects together the outer side wall and the inner side wall and a lower transverse wall opposite to the upper wall. All of the walls are typically covered with an outer sheath.

The body is mounted on the handlebar of the bicycle so as to project out the front of the latter and is configured so as to facilitate the cyclist's grip in certain race situations. It thus has an ergonomic shape, typically comprising an upward protuberance in the front area thereof.

A brake lever and, typically, one or more control members (levers and/or buttons) for actuating a derailleur or a servo-assisted gearshift and possibly also for controlling a cycle computer are associated with the body.

In order to ensure a secure and efficient grip of the brake lever for all cyclists, irrespective of the different sizes of their hands, some control devices of the prior art comprises an adjuster of the release position of the brake lever.

The aforementioned adjuster of the release position of the brake lever makes it possible to modify the release position by bringing the brake lever towards the handlebar, so as to make it easier for example for cyclists with small hands. Indeed, the brake lever may be too far from the handlebar to be able to be easily actuated by such a cyclist when he/she rides the bicycle gripping the handlebar at the opposite curved end portions thereof.

Known control devices for a bicycle with an adjuster of the release position of the brake lever are for example described in patent documents U.S. Pat. No. 9,242,695, DE 202015002728U1, U.S. Pat. No. 8,863,612, EP 1972537, EP 1964764, EP 1527987 and EP 1342655.

U.S. Pat. No. 8,261,888 describes a control device for a bicycle in which a detachment position of the brake lever is provided, namely a position of complete loss of tension for the brake cable of the bicycle. The detachment position makes it possible to release the cable and to open the brake pads, so as to be able to remove the wheel faster.

SUMMARY

The technical problem is that of providing a control device for a bicycle that allows the adjustment of the release position of the brake lever through a solution alternative to those of the prior art.

BRIEF DESCRIPTION OF THE DRAWING(S)

Further features and advantages of the control device for a bicycle of the present solution will become clearer from the following detailed description of some preferred embodiments thereof, made with reference to the attached drawings. In such drawings:

FIG. 3c is a front orthogonal view of a portion of the control device of FIG. 1a;

FIGS. 1a-5b show a first preferred embodiment of a control device for a bicycle in accordance with the present solution, wholly indicated with 10.

DETAILED DESCRIPTION OF THE PREFERRED EMBODIMENTS

Throughout the present description and in the following claims, the spatial terms, in particular the terms: front, rear, side, upper, lower, vertical and horizontal, are used with reference to the mounted condition of the control device on the handlebar of the bicycle. The terms "inner" and "outer"

identify, on the other hand, with reference to the handlebar in neutral position, the area towards the center of the handlebar with respect to an intermediate reference plane that crosses the control device substantially vertically.

Throughout the present description and in the following claims, the expression "release position" indicates the position taken up by the brake lever when the cyclist releases the brake lever, namely when the cyclist does not actuate the brake of the bicycle. In this context, any reference to the position taken up by the brake lever with respect to the handlebar should be taken as referring to the position taken up by the part of the brake lever arranged below the rotation axis and intended to be actuated by the fingers of the cyclist during braking.

The solution therefore relates to a control device for a bicycle, comprising:

a body configured to be associated with a bicycle handlebar;

a brake lever associated with said body and rotatable about a predetermined rotation axis;

wherein said body comprises a first abutment portion defining a first release position of said brake lever and at least one second abutment portion defining at least one second release position of said brake lever;

the control device further comprising an adjuster configured to selectively select one of said first release position and at least one second release position, wherein said adjuster comprises:

a pin mounted on said brake lever and slidable along a sliding direction substantially parallel to the predetermined rotation axis between a first stop position at which said pin goes into abutment on said first abutment portion and at least one second stop position at which said pin goes into abutment on said at least one second abutment portion;

a coupler that couples with said pin, said coupler being fixedly associated with said brake lever and configured to selectively stop said pin in said first stop position and in said at least one second stop position.

Advantageously, in the control device of the present solution the adjustment of the release position of the brake lever is obtained by selectively positioning the aforementioned pin in at least two distinct stop positions upon sliding along the aforementioned sliding direction, and the consequent abutment of the pin on at least two distinct abutment portions defined in the aforementioned body.

In particular, in the case in which two distinct abutment portions are provided, it is possible to adjust the release position of the brake lever on a "standard" release position for cyclists with average sized hands or on an alternative release position, for example suitable for cyclists with hands smaller or larger than average. In this alternative release position, the brake lever is closer to, or further from, the handlebar with respect to the "standard" release position.

In the case in which three distinct abutment portions are provided, on the other hand, it is possible to adjust the release position of the brake lever, in addition to on a "standard" release position, on two alternative release positions, one of which for example is suitable for cyclists with larger than average hands and the other is suitable for cyclists with smaller than average hands.

Preferably, one of said pin and said coupler comprises at least two circumferential grooves and the other of said pin and said coupler comprises a circumferential tooth configured to selectively couple with one of said at least two circumferential grooves.

In particular, in a preferred embodiment of the control device of the solution, said pin comprises said at least two circumferential grooves and said coupler comprises said circumferential tooth.

In an alternative embodiment of the device of the solution, said coupler comprises said at least two circumferential grooves and said pin comprises said circumferential tooth.

In a preferred embodiment of the control device of the solution, said circumferential tooth is formed on a bush fixedly associated with said brake lever and said at least two circumferential grooves are formed on said pin, said pin being slidable in said bush along said sliding direction.

In an alternative embodiment of the control device of the solution, said circumferential tooth is formed on said pin and said at least two circumferential grooves are formed on said bush.

Preferably, said first abutment portion and said at least one second abutment portion have different depths with respect to an outer surface of said body facing towards said brake lever. In this way, when the pin is in abutment on the different abutment portions formed on the body of the control device the brake lever is positioned with respect to the body at different angles about the predetermined rotation axis, thus defining the aforementioned different release positions of the brake lever.

In a preferred embodiment of the control device of the solution, said first abutment portion and said at least one second abutment portion are arranged side by side.

Preferably, said first abutment portion and said at least one second abutment portion are arranged on the same side with respect to said brake lever.

In an alternative embodiment of the control device of the solution, said first abutment portion and said at least one second abutment portion are arranged on opposite sides with respect to said brake lever.

Preferably, said body comprises a third abutment portion defining a detachment position of said brake lever, said adjuster being configured to selectively select said detachment position as an alternative to said first release position and at least one second release position.

Advantageously, the same adjuster provided to selectively select the different release positions of the brake lever is also used to select the detachment position of the brake lever.

In a preferred embodiment of the control device of the solution, said third abutment portion is arranged on the opposite side to at least one of said first abutment portion and said at least one second abutment portion with respect to said brake lever.

Preferably, said first abutment portion and said at least one second abutment portion are arranged on the same side with respect to said brake lever and said third abutment portion is arranged on the opposite side to said first abutment portion and at least one second abutment portion with respect to said brake lever.

In alternative embodiments of the control device of the solution, said first abutment portion and said at least one second abutment portion are arranged on opposite sides with respect to said brake lever and said third abutment portion is arranged on the same side as one of said first abutment portion and said at least one second abutment portion with respect to said brake lever.

Preferably, said pin is slidable along said sliding direction until a third stop position is reached at which said pin goes into abutment on said third abutment portion.

Preferably, said coupler is configured to selectively stop said pin in said third stop position.

More preferably, one of said pin and said coupler comprises a third circumferential groove and the other of said pin and said coupler comprises said circumferential tooth, wherein said third circumferential groove is configured to couple with said circumferential tooth when said pin reaches said third stop position.

In particular, in a preferred embodiment of the control device of the solution, said circumferential tooth is formed on said coupler and said third circumferential groove is formed on said pin in a position adjacent to said at least two circumferential grooves.

Preferably, said pin comprises opposite free end portions that project with respect to said brake lever when said pin is in said first stop position and at least one second stop position.

More preferably, at least one of said free end portions projects with respect to said brake lever when said pin is in said third stop position.

Such a provision allows the cyclist to easily select the desired release position or detachment position by pushing the pin along the sliding direction directly with a finger.

With reference to the drawing figures, a control device 10 comprises a body 20 configured to be mounted on the handlebar (not shown) of a racing bicycle at one of the opposite curved free end portions of the handlebar itself.

The control device 10 is, in particular, a right control device, namely a control device intended to be associated with the handlebar of the bicycle at the curved free end portion of the handlebar that, viewing the handlebar in its neutral position and from a viewpoint like that of the cyclist while riding, is to the right of the cyclist. However, it is clear that what is described hereinafter has analogous application in the case of a left control device.

The body 20 is configured to be fixed, at a rear wall 22 thereof, to a curved free end portion of the handlebar, so as to project at the front from said handlebar to be grippable by the cyclist in certain race conditions, like for example in climbs.

The fixing of the body 20 to the handlebar of the bicycle takes place through conventional connection means (not shown), like for example a strap.

The body 20 is defined, in addition to by the rear wall 22, by an outer side wall 26a (FIG. 2), an inner side wall 26b (FIGS. 1a-1c and 2) arranged on the opposite side to the outer side wall 26a with respect to an intermediate reference plane P (FIG. 3a) that passes vertically through the body 20, an upper transverse wall 28a (FIGS. 1a-1c) that connects together the outer and inner side walls 26a, 26b and a lower transverse wall 28b (FIGS. 1a-1c) opposite to the upper transverse wall 28a.

Throughout the present description, the expression "intermediate reference plane" is used to indicate any substantially vertical plane that passes through the control device 10, not necessarily a plane of symmetry or a mid-plane of the control device 10.

The outer side wall 26a and the inner side wall 26b of the control device 10 have respective surfaces substantially parallel to the intermediate reference plane P, apart from small concavities and convexities.

Figure 1A:
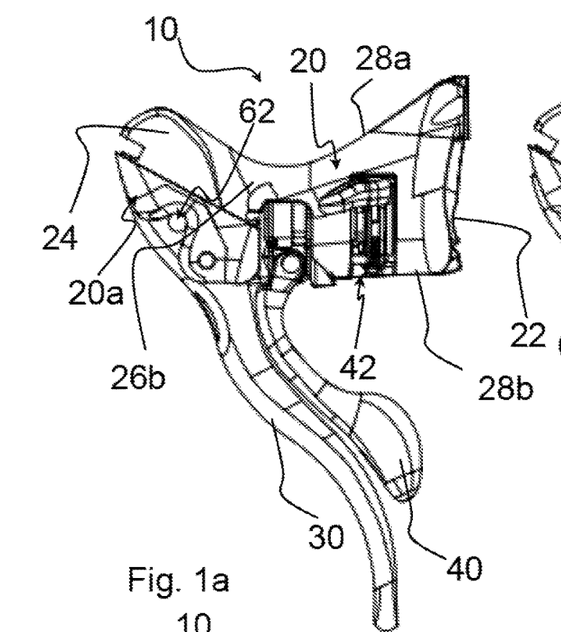
FIGS. 1a, 1b and 1c are orthogonal side views of a first preferred embodiment of a control device for a bicycle in accordance with the present solution, with the brake lever in three distinct positions.
Figure 1B:
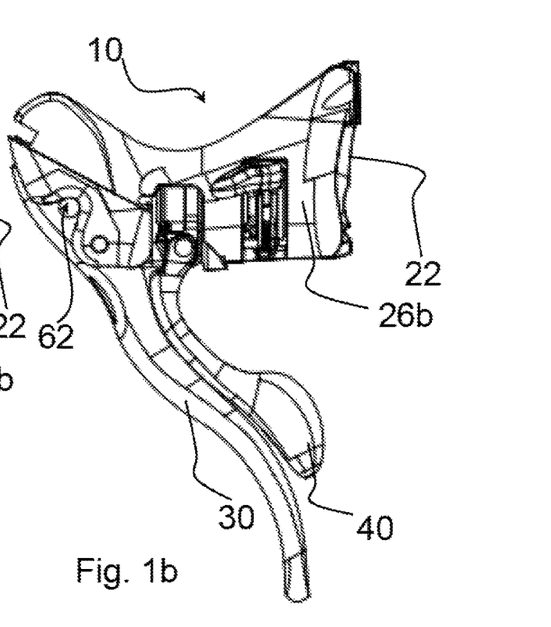
Figure 1C:
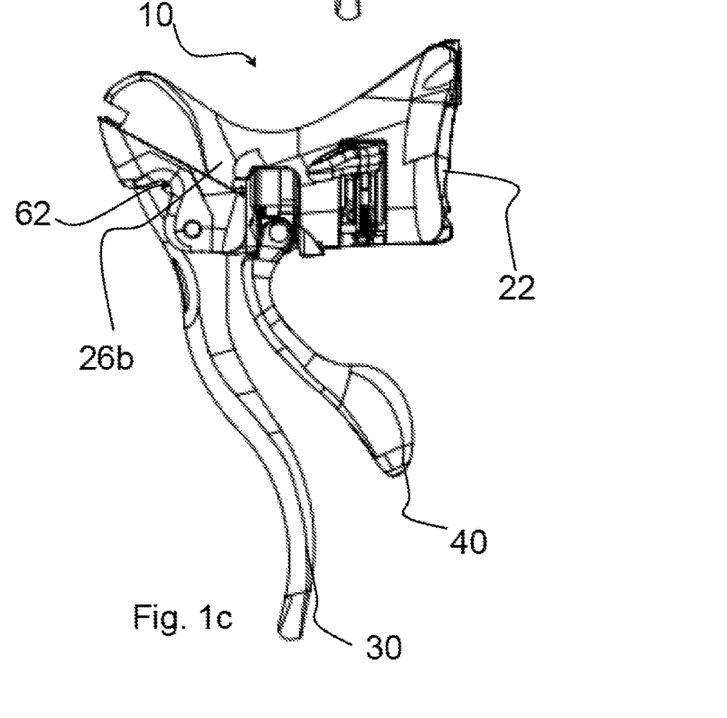

The body 20 is configured so as to make it easier for the cyclist to grip it. It thus has an ergonomic shape, typically comprising, in a front portion 20a thereof, an upward protuberance 24. The upper transverse wall 28a of the body 20 thus has a substantially saddle shaped profile, as shown in FIGS. 1a-1c.

All of the aforementioned walls of the control device 10 are covered with an outer covering sheath.

A brake lever 30 and a gearshift lever 40 intended to control a derailleur (not shown) of the bicycle in a first gearshifting direction (in particular the rear derailleur) are associated with the body 20.

The brake lever 30 is hinged to the body 20 at the front portion 20a of the body 20 in a totally conventional manner.

Figure 2:
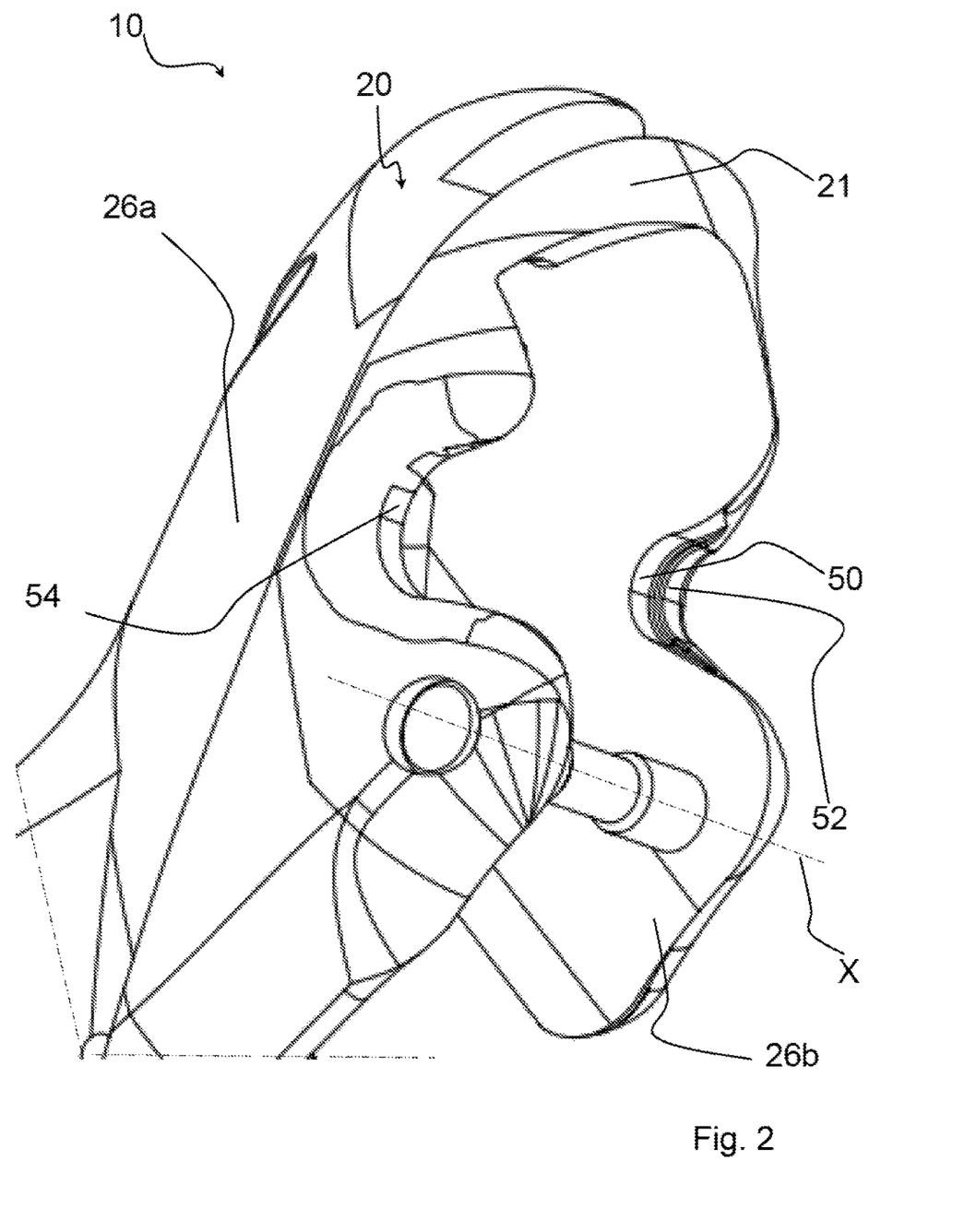
FIG. 2 is a perspective view of a portion of the control device of FIGS. 1a, 1b and 1c, without the aforementioned brake lever.

The brake lever 30 is rotatable about a predetermined rotation axis X (FIG. 2).

The gearshift lever 40 is arranged behind the brake lever 30 and is articulated to the body 20 in a totally conventional manner.

The control device 10 can comprise a further gearshift lever (not shown) for actuating the derailleur in a gearshifting direction opposite to that in which the derailleur is actuated by acting on the gearshift lever 40. The further gearshift lever is articulated to the body 20 in a totally conventional manner. The gearshift lever 40 and the further gearshift lever act on a derailleur control device 42, which is of the mechanical type in the case illustrated, arranged inside the body 20.

As shown in FIG. 2, the body 20 comprises a first abutment portion 50 defining a first release position of the brake lever 30 and a second abutment portion 52 defining a second release position of the brake lever 30.

The first abutment portion 50 and the second abutment portion 52 have different depths with respect to an outer surface 21 of the body 20 facing towards the brake lever 30 (FIG. 2). In particular, the first abutment portion 50 has a depth greater than that of the second abutment portion 52.

In the non-limiting example shown in FIG. 2, the first abutment portion 50 and the second abutment portion 52 are arranged side-by-side and on the same side with respect to the brake lever 30. In particular, the abutment portions 50 and 52 are formed on the inner side wall 26b of the body 20.

The first release position is shown in FIGS. 1a, 3a, 3b and 3c and is indicated hereinafter as "standard release position."

Figure 4A:
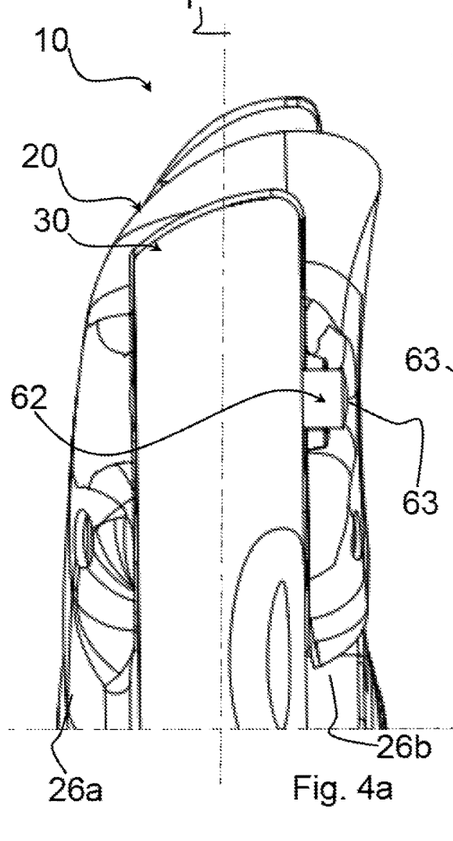
FIGS. 4a and 4b are, respectively, an orthogonal front view and a section view of the control device of FIG. 1b, with the brake lever in a second release position.
Figure 4B:
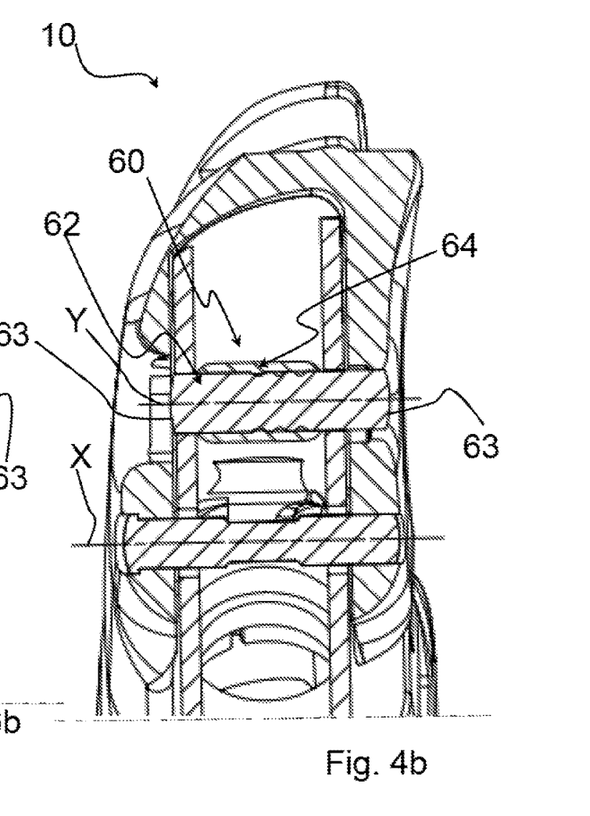

The second release position, on the other hand, is shown in FIGS. 1b, 4a and 4b and is indicated hereinafter as "release position for small hands." The standard release position is suitable for cyclists with average sized hands, whereas the release position for small hands is suitable for cyclists with smaller than average hands. In the release position for small hands, the brake lever 30 is closer to the rear wall 22 of the body 20 (and therefore closer to the handlebar) than in the standard release position, as can be seen by comparing FIGS. 1a and 1b.

The control device 10 further comprises an adjuster 60 configured to selectively select one of the aforementioned release positions.

Figures 3A, 3B:
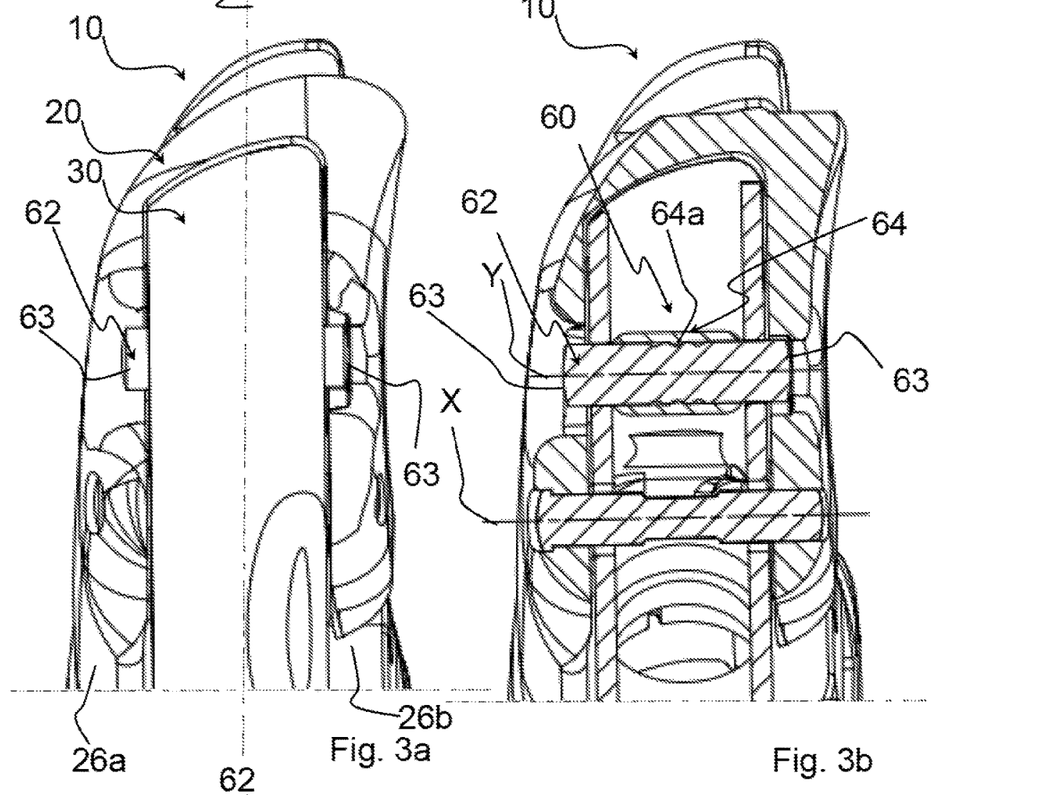
FIGS. 3a and 3b are, respectively, an orthogonal front view and a section view of the control device of FIG. 1a, with the brake lever in a first release position.

The adjuster 60 comprises a pin 62 mounted on the brake lever 30 (FIG. 3b).

The pin 62 is slidable along a sliding direction y, which is substantially parallel to the rotation axis X, between a first stop position (FIGS. 3a-3c) and a second stop position (FIGS. 4a and 4b).

At the first stop position the pin 62 goes into abutment on the first abutment portion 50 of the body 20, whereas at the second stop position the pin 62 goes into abutment on the second abutment portion 52 of the body 20.

The adjuster 60 also comprises a coupler 64 that couples with the pin 62. The coupler 64 is fixedly associated with the brake lever 30 and is configured to selectively stop the pin 62 in the aforementioned first and second stop positions.

Figures 5A, 5B:
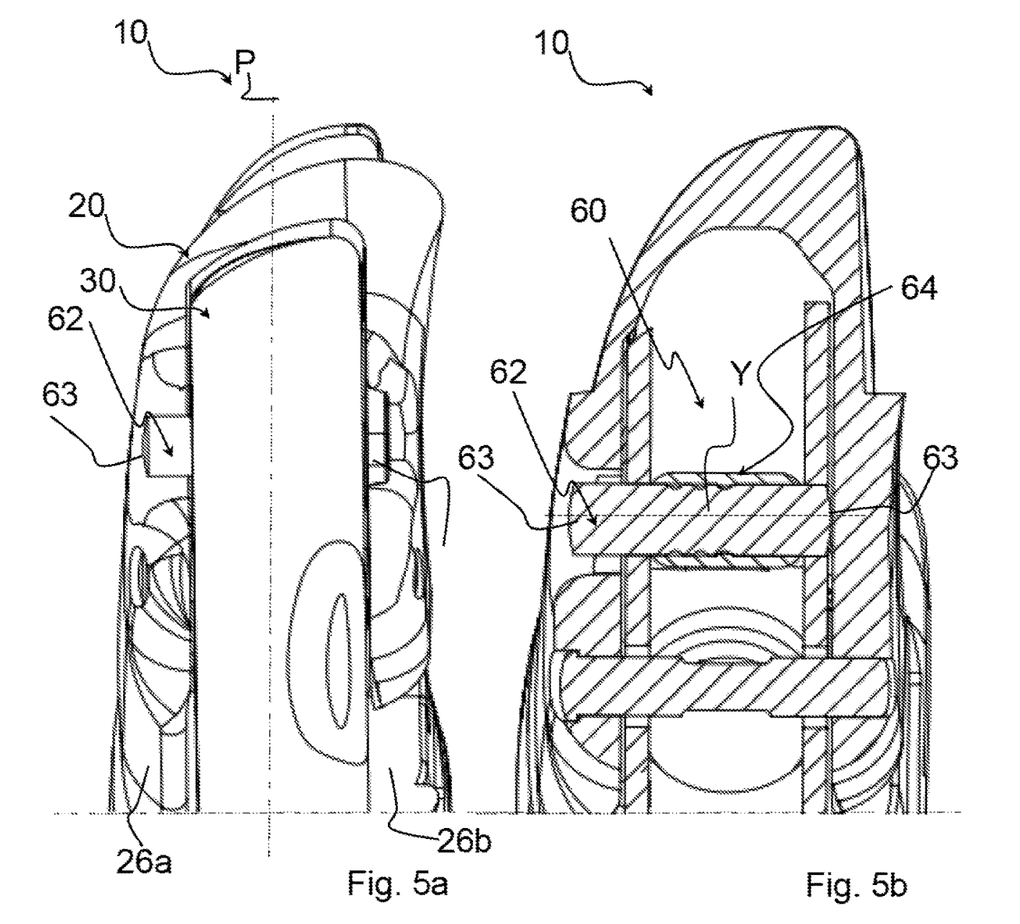
FIGS. 5a and 5b are, respectively, an orthogonal front view and a section view of the control device of FIG. 1c, with the brake lever in a detachment position.

Preferably, as shown in the attached drawings, the coupler 64 is defined by a bush (indicated with 64 in FIGS. 3b, 4b and 5b). The pin 62 can slide along the sliding direction y inside the bush.

In the non-limiting example shown (in particular, see FIG. 3c), the pin 62 comprises two circumferential grooves 62a arranged side by side with respect to the axis Y of the pin 62, namely along the sliding direction y, and the coupler 64 comprises a circumferential tooth 64a configured to selectively couple with one of the two circumferential grooves 62a.

Figure 3C:
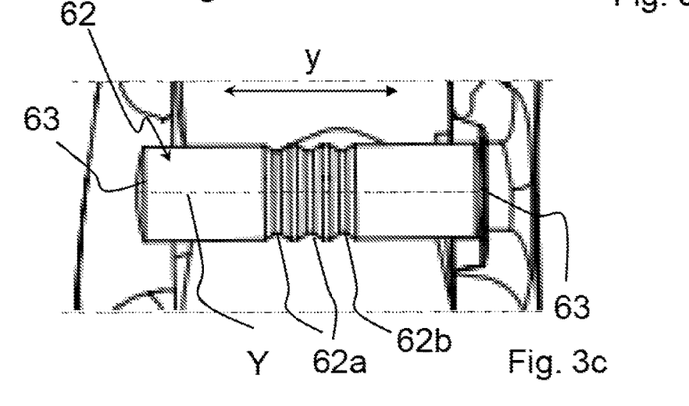

The coupling between the circumferential tooth 64a and the two circumferential grooves 62a is preferably of the snap type.

As shown in FIG. 2, the body 20 further comprises a third abutment portion 54 defining a detachment position of the brake lever 30.

The adjuster 60 is configured to selectively select the detachment position as an alternative to the aforementioned first and second release position.

The third abutment portion 54 is arranged on the opposite side to the abutment portions 50 and 52 with respect to the brake lever 30. In particular, the third abutment portion 54 is formed on the outer side wall 26a of the body 20.

The third abutment portion 54 has a depth, with respect to the outer surface 21 of the body 20, greater than that of the first abutment portion 50 and of the second abutment portion 52 (FIG. 2).

The detachment position is shown in FIGS. 1c, 5a and 5b.

The pin 62 is slidable along the sliding direction y so as to reach, in addition to the aforementioned first and second stop positions, a third stop position (FIG. 5b), at which the pin 62 goes into abutment on the third abutment portion 54.

The coupler 64 is configured to selectively stop the pin 62 in the aforementioned third stop position as well as in the aforementioned first and second stop positions.

In particular, the pin 62 comprises a third circumferential groove 62b, as shown in FIG. 3c. The third circumferential groove 62b and the two circumferential grooves 62a are arranged side by side with respect to the axis Y of the pin 62, namely along the sliding direction y.

The third circumferential groove 62b is configured to couple with the circumferential tooth 64a of the coupler 64, thus stopping the pin 62 in the aforementioned third stop position.

Preferably, the coupling between the circumferential tooth 64a and the third circumferential groove 62b is also of the snap type.

As shown in FIGS. 3a-3c, the pin 62 comprises opposite free end portions 63 that project with respect to the brake lever 30 when the pin 62 is in the aforementioned first stop position.

As shown in FIGS. 4a-4b, one of the aforementioned free end portions 63 projects laterally with respect to the brake lever 30 when the pin 62 is in the aforementioned second stop position.

As shown in FIGS. 5a-5b, the opposite free end portion 63 of the pin 62 projects laterally with respect to the brake lever 30 when the pin 62 is in the aforementioned third stop position.

FIGS. 6a-11b show a second preferred embodiment of a control device for a bicycle in accordance with the present solution, wholly indicated with 10.

In such FIGS. 6a-11b, elements that are analogous or functionally corresponding to those described above with reference to the first embodiment shown in FIGS. 1a-5b are indicated with the same reference numeral and for their detailed description reference should be made to the above description.

The second embodiment shown in FIGS. 6a-11b differs from the one shown in FIGS. 1a-5b in that the control device 10 is configured so that the brake lever 30 can also take up a third release position, in addition to the two release positions and the detachment position provided in the first embodiment shown in FIGS. 1a-5b.

Figure 6A:
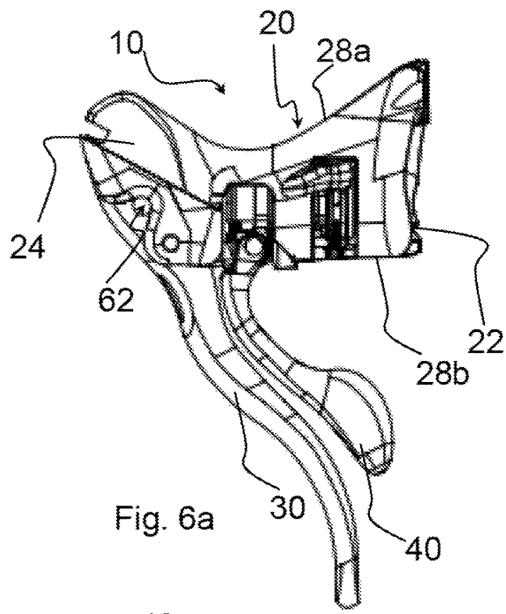
FIGS. 6a, 6b, 6c and 6d are orthogonal side views of a second preferred embodiment of a control device for a bicycle in accordance with the present solution, with the brake lever in four distinct positions.
Figure 6B:
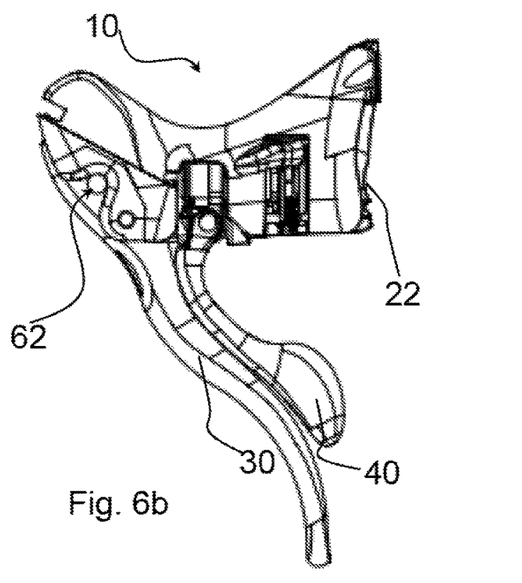
Figure 6C:
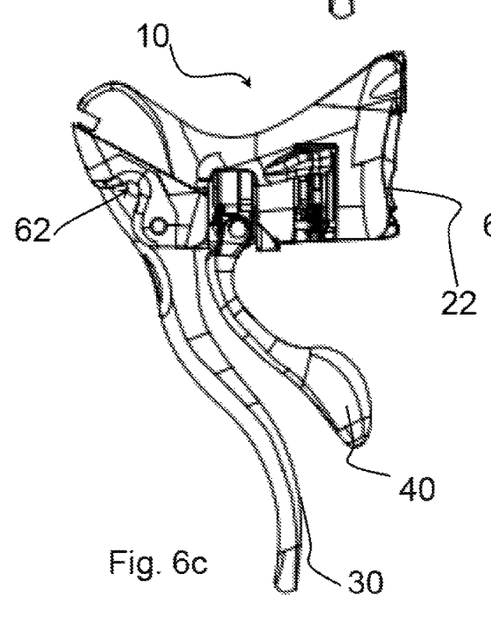
Figure 10A:
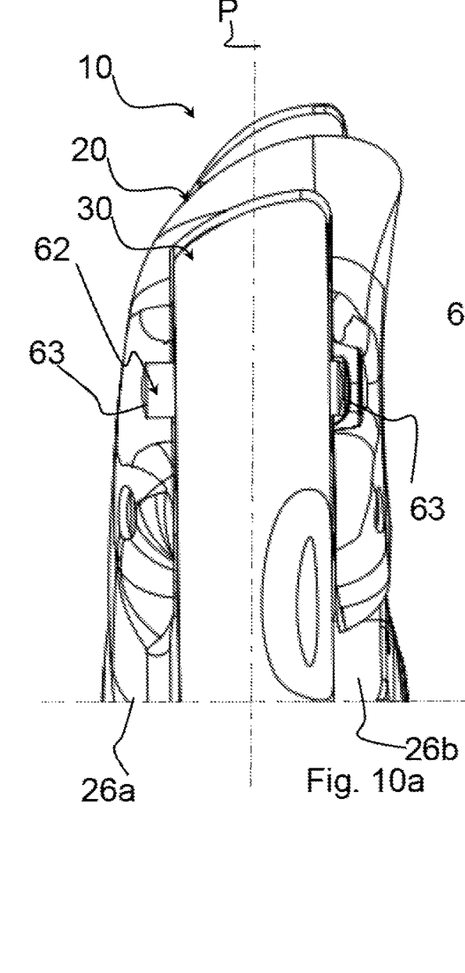
FIGS. 10a and 10b are, respectively, an orthogonal front view and a section view of the control device of FIG. 6c, with the brake lever in a third release position.
Figure 10B:
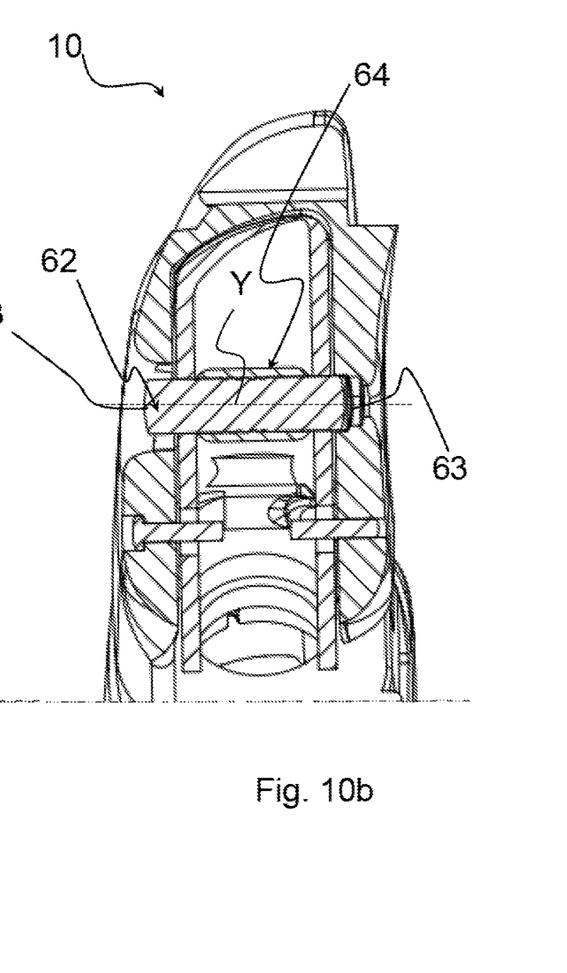

Such a third release position is shown in FIGS. 6c, 10a and 10b and it is indicated hereinafter as "release position for large hands".

Figure 8A:
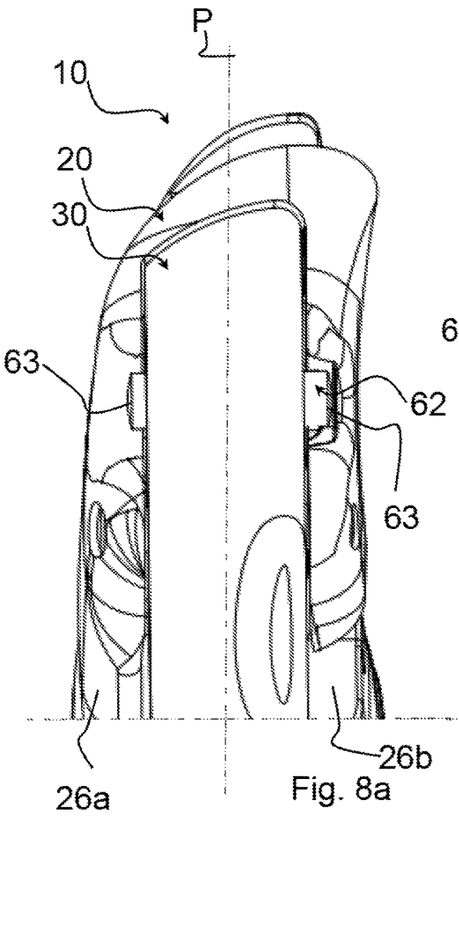
FIGS. 8a and 8b are, respectively, an orthogonal front view and a section view of the control device of FIG. 6a, with the brake lever in a first release position.
Figure 8B:
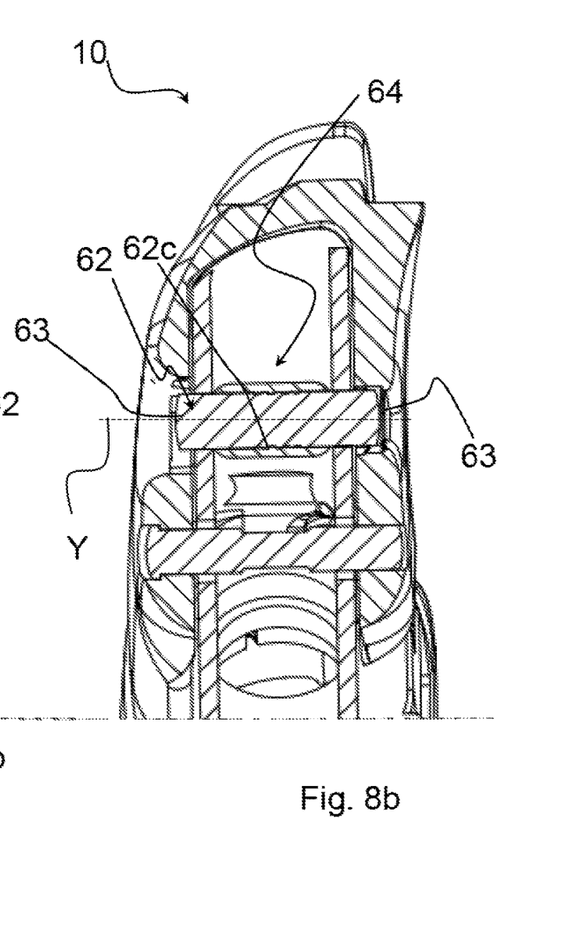

The first release position is shown in FIGS. 6a, 8a and 8b and is indicated hereinafter as "standard release position". Such a first release position corresponds to the first release position shown in FIGS. 1a, 3a, 3b and 3c.

Figure 9A:
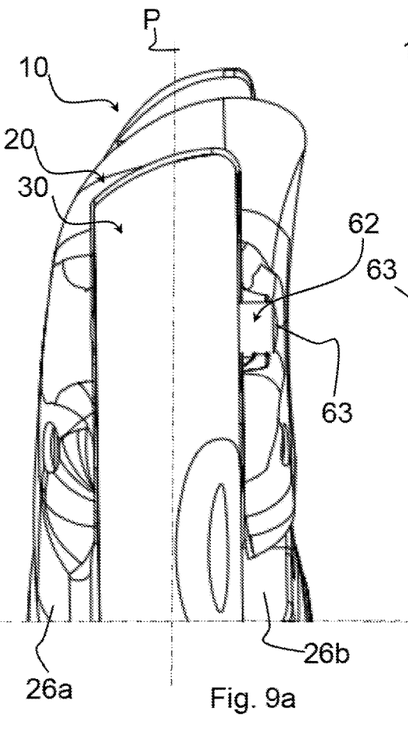
FIGS. 9a and 9b are, respectively, an orthogonal front view and a section view of the control device of FIG. 6b, with the brake lever in a second release position.
Figure 9B:
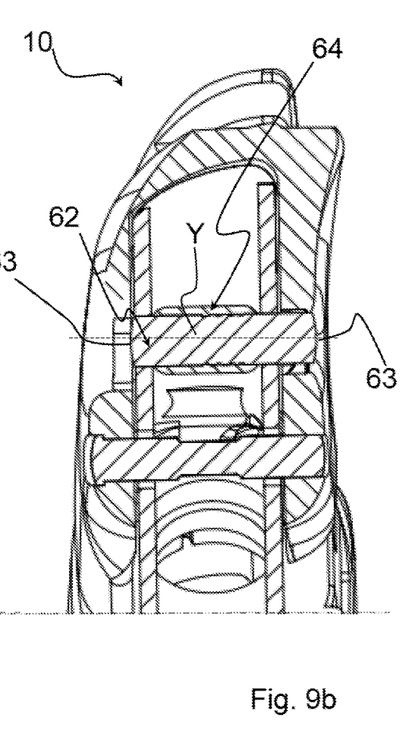

The second release position is shown in FIGS. 6b, 9a and 9b and is indicated hereinafter as "release position for small hands". Such a second release position corresponds to the second release position shown in FIGS. 1b, 4a and 4b.

Figure 6D:
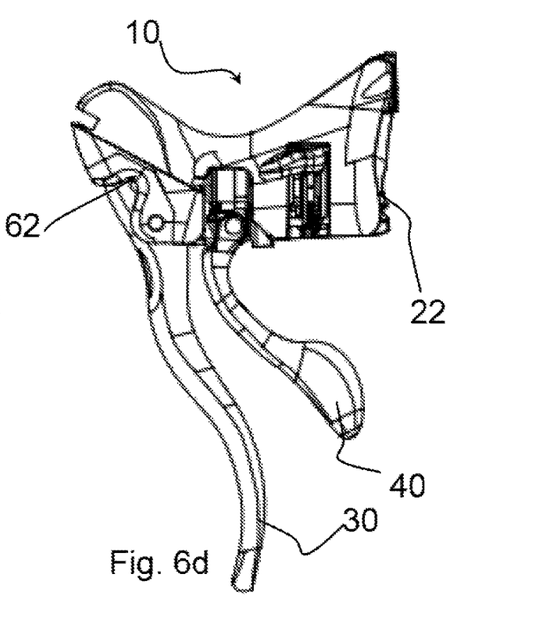
Figures 11A, 11B:
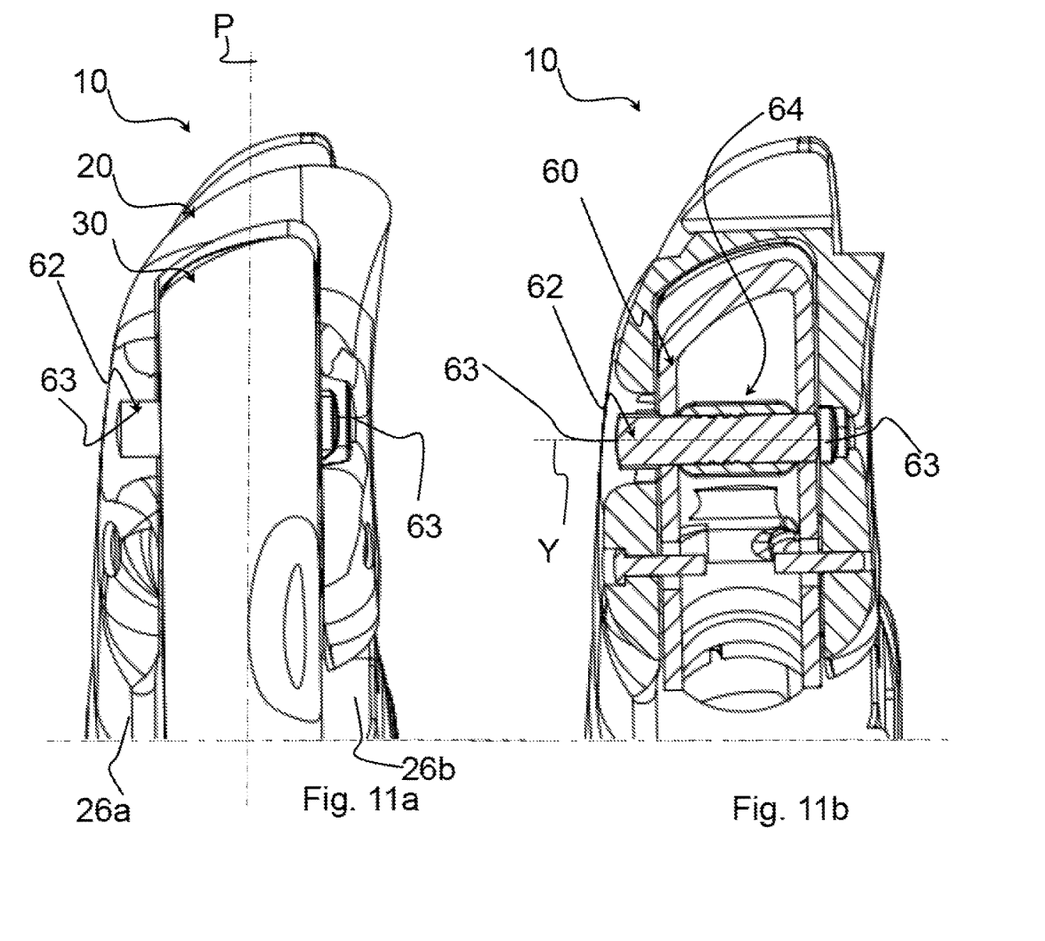
FIGS. 11a and 11b are, respectively, an orthogonal front view and a section view of the control device of FIG. 6d, with the brake lever in a detachment position.

The detachment position is shown in FIGS. 6d, 11a and 11b and corresponds to the detachment position shown in FIGS. 1c, 5a and 5b.

The release position for large hands is suitable for cyclists with larger than average hands. In the release position for large hands, the brake lever 30 is further far from the rear wall 22 of the body 20 (and therefore further far from the handlebar) with respect to the standard release position, as can be seen by comparing FIGS. 6a and 6c.

Figure 7:
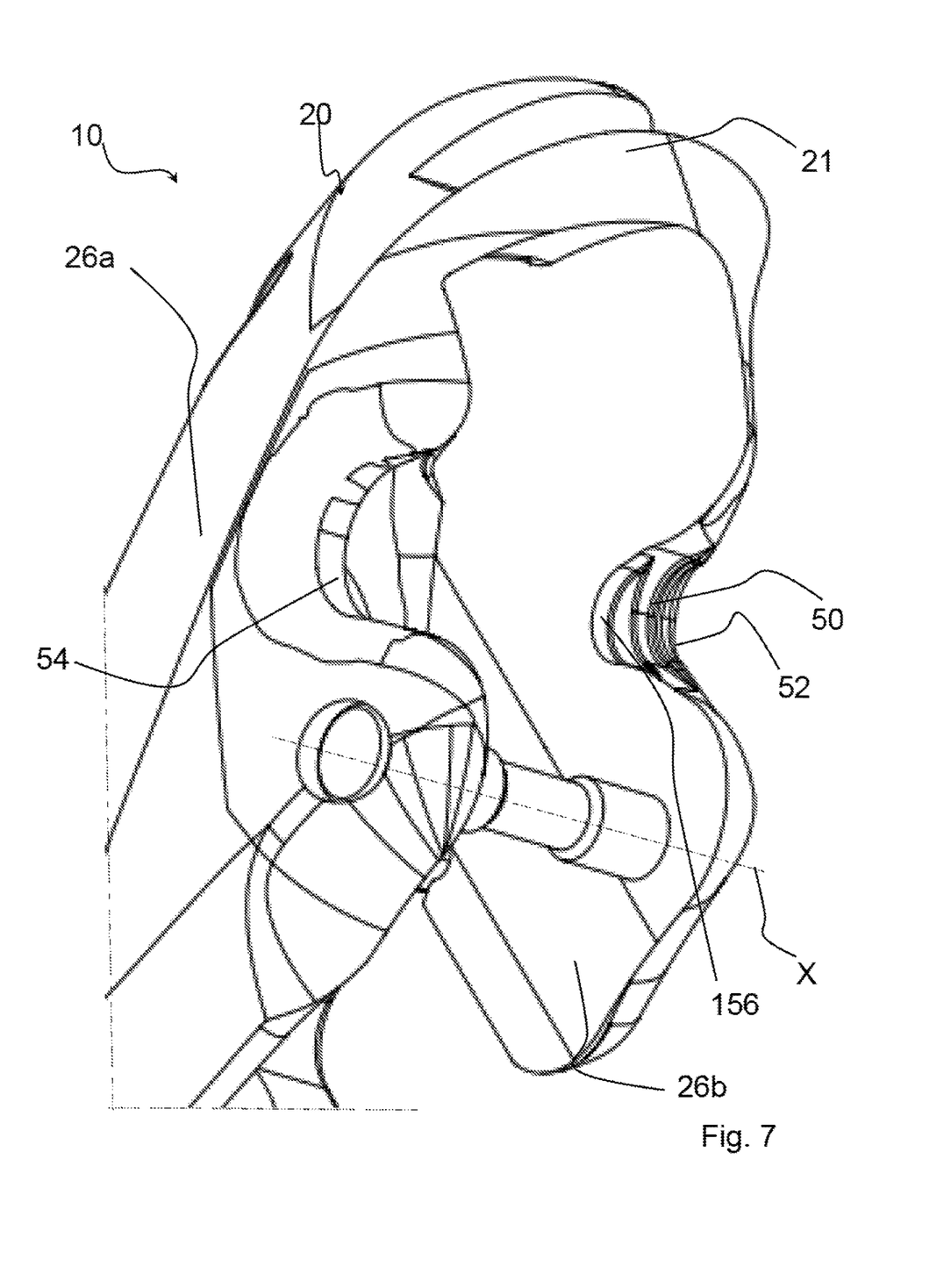
FIG. 7 is a perspective view of a portion of the control device of FIGS. 6a, 6b, 6c and 6d, without the aforementioned brake lever.

As shown in FIG. 7, the body 20 comprises, in addition to the first abutment portion 50 defining the first release position of the brake lever 30, the second abutment portion 52 defining the second release position of the brake lever 30 and the third abutment portion 54 defining the detachment position of the brake lever 30, also a fourth abutment portion 156 defining the third release position of the brake lever 30.

The first abutment portion 50, the second abutment portion 52 and the fourth abutment portion 156 have different depths with respect to the outer surface 21 of the body 20 facing towards the brake lever 30 (FIG. 7). In particular, the fourth abutment portion 156 has a depth greater than that of the first abutment portion 50, which in turn is greater than that of the second abutment portion 52. The fourth abutment portion 156 further has a depth smaller than that of the third abutment portion 54.

In the non-limiting example shown in FIG. 7, the first abutment portion 50, the second abutment portion 52 and the fourth abutment portion 156 are arranged side by side and on the same side with respect to the brake lever 30. In particular, the abutment portions 50, 52 and 156 are formed on the inner side wall 26b of the body 20.

The third abutment portion 54 is arranged on the opposite side to the abutment portions 50, 52 and 156 with respect to the brake lever 30. In particular, the third abutment portion 54 is formed on the outer side wall 26a of the body 20.

The adjuster 60 is configured to selectively select one of the aforementioned three release positions or the detachment position.

The pin 62 included in the adjuster 60 is slidable along the sliding direction y along the first stop position (FIGS. 8a and 8b), the second stop position (FIGS. 9a and 9b), the third stop position (FIGS. 11a and 11b) and a fourth stop position (FIGS. 10a and 10b).

The first, second and third stop position are analogous respectively to those of FIGS. 3a-3c, 4a-4b and 5a-5b, at which the pin 62 goes into abutment on the first, second and third abutment portion 50, 52 and 54, respectively.

At the fourth stop position the pin 62 goes into abutment on the fourth abutment portion 156.

The coupler 64 included in the adjuster 60 is configured to selectively stop the pin 62, in addition to in the aforementioned first, second and third stop positions, also in the aforementioned fourth stop position.

In particular, the pin 62 comprises a fourth circumferential groove 62c. The fourth circumferential groove 62c, the third circumferential groove 62b and the two circumferential grooves 62a are arranged side by side with respect to the axis Y of the pin 62, i.e. along the sliding direction y.

The fourth circumferential groove 62c is configured to couple with the circumferential tooth 64a of the coupler 64, thus stopping the pin 62 in the aforementioned fourth stop position.

Preferably, the coupling between the circumferential tooth 64a and the fourth circumferential groove 62c is also of the snap type.

As shown in FIGS. 8a-8b and 10a-10b, the opposite free end portions 63 of the pin 62 project with respect to the brake lever 30 when the pin 62 is in the aforementioned first and fourth stop position.

As shown in FIGS. 9a-9b, one of the aforementioned free end portions 63 projects laterally with respect to the brake lever 30 when the pin 62 is in the aforementioned second stop position.

As shown in FIGS. 11a-11b, the opposite free end portion 63 of the pin 62 projects laterally with respect to the brake lever 30 when the pin 62 is in the aforementioned third stop position.

The operation of the control device 10 of the solution is already clear from what has been described above and is specified as follows.

The cyclist easily selects the desired release position of the brake lever 30 or the detachment position by pushing the pin 62 along the sliding direction y directly with a finger.

In the first embodiment of the control device shown in FIGS. 1a-5b, the cyclist can pass from the standard release position (FIGS. 1a, 3a-3c) to the release position for small hands (FIGS. 1b, 4a-4b) by pushing the pin 62 towards the inner side of the control device 10 (namely by pushing the free end portion 63 of the pin 62 projecting from the brake lever 30 at the outer side wall 26a of the control device 10 towards the inner side wall 26b of the control device 10), whereas it can pass from the standard release position (FIGS. 1a, 3a-3c) to the detachment position (FIGS. 1c, 5a-5b) by pushing the pin 62 towards the outer side of the control device 10 (namely by pushing the free end portion 63 of the pin 62 projecting from the brake lever 30 at the inner side wall 26b of the control device 10 towards the outer side wall 26a of the control device 10).

If the brake lever 30 is in the release position for small hands (FIGS. 1b, 4a-4b), by pushing the pin 62 towards the outer side of the control device 10 it is possible to pass to the standard release position (FIGS. 1a, 3a-3c).

If the brake lever 30 is in the detachment position (FIGS. 1c, 5a-5b), by pushing the pin 62 towards the inner side of the control device 10 it is possible to pass to the standard release position (FIGS. 1a, 3a-3c).

In the second embodiment of the control device shown in FIGS. 6a-11b, the cyclist can pass from the standard release position (FIGS. 6a, 8a-8b) to the release position for small hands (FIGS. 6b, 9a-9b) by pushing the pin 62 towards the inner side of the control device 10 (namely by pushing the free end portion 63 of the pin 62 projecting from the brake lever 30 at the outer side wall 26a of the control device 10 towards the inner side wall 26b of the control device 10), whereas it can pass from the standard release position (FIGS. 6a, 8a-8b) to the release position for large hands (FIGS. 6c, 10a-10b) by pushing the pin 62 towards the outer side of the control device 10 (namely by pushing the free end portion 63 of the pin 62 projecting from the brake lever 30 at the inner side wall 26b of the control device 10 towards the outer side wall 26a of the control device 10).

If the brake lever 30 is in the release position for small hands (FIGS. 6b, 9a-9b), by pushing the pin 62 towards the outer side of the control device 10 it is possible to pass to the standard release position (FIGS. 6a, 8a-8b).

If the brake lever 30 is in the release position for large hands (FIGS. 6c, 10a-10b), by pushing the pin 62 towards the outer side of the control device 10 it is possible to pass to the detachment position (FIGS. 6d, 11a-11b), whereas by pushing the pin 62 towards the inner side of the control device 10 it is possible to pass to the standard release position (FIGS. 6a, 8a-8b).

If the brake lever 30 is in the detachment position (FIGS. 6d, 11a-11b), by pushing the pin 62 towards the inner side of the control device 10 it is possible to pass to the release position for large hands (FIGS. 6c, 10a-10b) and by pushing the pin 62 further towards the inner side of the control device 10 it is possible to pass to the standard release position (FIGS. 6a, 8a-8b).

Of course, in order to satisfy specific and contingent requirements, those skilled in the art can bring numerous modifications and variants to the control device for a bicycle described above, all of which are in any case within the scope of protection of the present solution as defined by the following claims.

For example, the position of the aforementioned abutment portions 50, 52, 54, 156 on the body 20 can be different from the one described above.

For example, one or more of the aforementioned abutment portions 50, 52, 156 can be formed on the body 20 on the same side as the abutment portion 54 with respect to the brake lever 30.

Furthermore, by making further abutment portions on the body 20 and further circumferential grooves on the pin 62 it is possible to define further release or detachment positions of the brake lever 30.

What is claimed is:

1. A control device for a bicycle, comprising:
a body configured to be associated with a bicycle handlebar;
a brake lever associated with said body and rotatable about a predetermined rotation axis (X);
wherein said body comprises a first abutment portion defining a first release position of said brake lever and at least one second abutment portion defining at least one second release position of said brake lever;
the control device further comprising an adjuster configured to select one of said first release position and at least one second release position, wherein said adjuster comprises:
a pin mounted on said brake lever and slidable in a sliding direction (Y) substantially parallel to the predetermined rotation axis (X) between a first stop position at which said pin goes into abutment on said first abutment portion and at least one second stop position at which said pin goes into abutment on said at least one second abutment portion; and,
a coupler that couples with said pin, is fixedly associated with said brake lever, and is configured to selectively stop said pin in said first stop position and said at least one second stop position.

2. The control device according to claim 1, wherein one of said pin and said coupler comprises at least two circumferential grooves and the other of said pin and said coupler comprises a circumferential tooth configured to selectively couple with one of said at least two circumferential grooves.

3. The control device according to claim 2, wherein said coupler is defined by a bush, said circumferential tooth is formed on said bush and said at least two circumferential grooves are formed on said pin and said pin is slidable in said bush along said sliding direction (Y).

4. The control device according to claim 1, wherein said first abutment portion and said at least one second abutment portion have different depths with respect to an outer surface of said body that faces towards said brake lever.

5. The control device according to claim 1, wherein said first abutment portion and said at least one second abutment portion are arranged side-by-side, and on the same side with respect to said brake lever.

6. The control device according to claim 1, wherein said body comprises a third abutment portion defining a detachment position of said brake lever and said adjuster is configured to selectively select said detachment position defined by said third abutment portion as an alternative to said first release position and at least one second release position.

7. The control device according to claim 6, wherein said third abutment portion is arranged on an opposite side to at least one of said first abutment portion and said at least one second abutment portion with respect to said brake lever.

8. The control device according to claim 7, wherein said pin is slidable along said sliding direction (Y) until a third stop position at which said pin goes into abutment on said third abutment portion is reached, and wherein said coupler is configured to selectively stop said pin in said third stop position.

9. The control device according to claim 8, wherein one of said pin and said coupler comprises at least two circumferential grooves and the other of said pin and said coupler comprises a circumferential tooth configured to selectively couple with one of said at least two circumferential grooves and, the one of said pin and said coupler comprises a third circumferential groove configured to couple with said circumferential tooth when said pin reaches said third stop position.

10. The control device according to claim 1, wherein said pin comprises opposite free end portions that project with respect to said brake lever when said pin is in said first stop position and at least one second stop position.

11. The control device according to claim 10, wherein at least one of said free end portions projects with respect to said brake lever when said pin is in a third stop position.

* * * * *